(12) United States Patent
Zuk

(10) Patent No.: US 7,904,479 B2
(45) Date of Patent: *Mar. 8, 2011

(54) DETECTION OF NETWORK SECURITY BREACHES BASED ON ANALYSIS OF NETWORK RECORD LOGS

(75) Inventor: Nir Zuk, Redwood City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 608 days.

This patent is subject to a terminal disclaimer.

(21) Appl. No.: 11/951,518

(22) Filed: Dec. 6, 2007

(65) Prior Publication Data

US 2008/0155697 A1    Jun. 26, 2008

Related U.S. Application Data

(63) Continuation of application No. 10/407,823, filed on Apr. 4, 2003, now Pat. No. 7,325,002.

(51) Int. Cl.
G06F 7/00 (2006.01)
G06F 17/30 (2006.01)

(52) U.S. Cl. .......................... 707/791; 707/802

(58) Field of Classification Search .......... 707/687–704, 707/736–747, 790–811, 999.001–999.01, 707/999.1–999.102
See application file for complete search history.

(56) References Cited

U.S. PATENT DOCUMENTS

| | | | | |
|---|---|---|---|---|
| 5,418,947 A | * | 5/1995 | Hsu et al. | 1/1 |
| 5,430,871 A | * | 7/1995 | Jamoussi et al. | 1/1 |
| 5,842,196 A | * | 11/1998 | Agarwal et al. | 1/1 |
| 5,907,848 A | * | 5/1999 | Zaiken et al. | 1/1 |
| 6,061,692 A | * | 5/2000 | Thomas et al. | 707/613 |
| 6,233,686 B1 | | 5/2001 | Zenchelsky et al. | 726/1 |
| 6,341,130 B1 | | 1/2002 | Lakshman et al. | 370/389 |
| 6,374,264 B1 | * | 4/2002 | Bohannon et al. | 1/1 |
| 6,496,935 B1 | | 12/2002 | Fink et al. | 726/13 |
| 6,546,388 B1 | * | 4/2003 | Edlund et al. | 1/1 |
| 6,651,243 B1 | | 11/2003 | Berry et al. | 717/130 |
| 6,718,324 B2 | * | 4/2004 | Edlund et al. | 1/1 |
| 6,769,074 B2 | * | 7/2004 | Vaitzblit | 714/16 |
| 6,775,831 B1 | | 8/2004 | Carrasco et al. | 707/200 |
| 6,816,455 B2 | * | 11/2004 | Goldberg et al. | 370/230 |
| 7,296,070 B2 | * | 11/2007 | Sweeney et al. | 709/224 |
| 7,325,002 B2 | * | 1/2008 | Zuk | 1/1 |

(Continued)

FOREIGN PATENT DOCUMENTS

JP    2002-124996    4/2002

(Continued)

OTHER PUBLICATIONS

PCT International Search Report, Aug. 12, 2004, 4 pages.

(Continued)

*Primary Examiner* — Usmaan Saeed
(74) *Attorney, Agent, or Firm* — Harrity & Harrity, LLP

(57) ABSTRACT

Computer program products and methods of inspecting a log of security records in a computer network are provided. The method includes retrieving a log record, processing the log record including deriving a key to a table, determining a data value from information in the log record and adding the data value to a list of data values associated with the key if the data value is unique. One or more entries of the table are evaluated based on predetermined criteria to detect attempted security breaches.

21 Claims, 11 Drawing Sheets

U.S. PATENT DOCUMENTS

| | | | |
|---|---|---|---|
| 7,512,810 B1* | 3/2009 | Ryan | 713/189 |
| 7,779,021 B1* | 8/2010 | Smith et al. | 707/760 |
| 2002/0138762 A1* | 9/2002 | Horne | 713/201 |
| 2003/0033531 A1 | 2/2003 | Hanner | 713/176 |
| 2003/0041125 A1* | 2/2003 | Salomon | 709/220 |
| 2003/0154399 A1 | 8/2003 | Zuk et al. | 713/201 |
| 2003/0154402 A1* | 8/2003 | Pandit et al. | 713/201 |
| 2003/0206100 A1* | 11/2003 | Richman et al. | 340/506 |
| 2004/0078568 A1* | 4/2004 | Pham et al. | 713/165 |
| 2004/0148382 A1 | 7/2004 | Narad et al. | 709/223 |
| 2004/0199535 A1* | 10/2004 | Zuk | 707/102 |
| 2004/0261030 A1 | 12/2004 | Nazzai | 715/738 |
| 2005/0190694 A1 | 9/2005 | Ben-Nun et al. | 370/229 |
| 2006/0106860 A1* | 5/2006 | Dee et al. | 707/102 |

FOREIGN PATENT DOCUMENTS

| | | |
|---|---|---|
| WO | WO 02/27443 A2 | 4/2002 |
| WO | WO 02/091700 A2 | 11/2002 |

OTHER PUBLICATIONS

Solar Designer: "Designing and Attacking Port Scan Detection Tools," Phrack Magazine, Online, vol. 8, No. 53, Jul. 8, 1998, 11 pages, XP-002291942.

R. Sedgewick: "Chapter Fourteen—Hashing," Algorithms in C—Third Edition, 1998, pp. 573-608.

* cited by examiner

DETECTION OF NETWORK SECURITY BREACHES BASED ON ANALYSIS OF NETWORK RECORD LOGS

RELATED APPLICATION

This application is a continuation of U.S. patent application Ser. No. 10/407,823 filed Apr. 4, 2003 now U.S. Pat. No. 7,325,002, the disclosure of which is incorporated herein by reference.

BACKGROUND

The present invention relates to a method for controlling computer network security.

Firewalls and intrusion detection systems are devices that are used to protect a computer network from unauthorized or disruptive users. A firewall can be used to secure a local area network from users outside the local area network. A firewall checks, routes, and frequently labels all messages sent to or from users outside the local area network. An intrusion detection system (IDS) can be used to recognize suspicious patterns of behavior in a communication system. Examples of an intrusion detection system include a network intrusion detection system (NIDS) and a host intrusion detection system (HIDS). A NIDS can be used to examine information being communicated within a network to recognize suspicious patterns of behavior. A HIDS can be used to examine information being communicated through a particular host computer within a network to recognize suspicious patterns of behavior. Information obtained by the intrusion detection system (IDS) can be used to block unauthorized or disruptive users from accessing the network.

Either a firewall or an intrusion detection system can create log records that record incoming and outgoing events into or out of a network. Log records can include events such as security violations, bandwidth usage, email usage, and employee access to the Internet. Typically, these log records are reviewed by network security administrators in order to detect attempted security breaches or to find trends in traffic patterns. Since the number of log records is typically quite large, query languages are often used to analyze the log records to detect attempted security intrusions. Query languages can also be used to analyze the log records and generate reports summarizing these log records for the network administrator. These reports can be used by the network administrator to respond to a recognized network security intrusion. Query language instructions operating on log records can also be used to generate alerts for the network administrator. Since the number of log records can be quite large, the network security solutions utilizing query language instructions to analyze the log records can be slow. Query language based solutions can be slow when all the log records are analyzed every time a new query is received.

SUMMARY OF THE INVENTION

The present invention provides a method and apparatus, including computer-program products for detecting attempted network security breaches. In one aspect, the invention provides a method of inspecting a log of security records in a computer network and includes retrieving a log record, processing the log record including deriving a key to a table, determining a data value from information in the log record and adding the data value to a list of data values associated with the key if the data value is unique. The method includes evaluating one or more entries of the table based on predetermined criteria to detect attempted security breaches.

Aspects of the invention can include one or more of the following features. The table can be a hash table. The list of data values can be implemented as a linked list. The list of data values can be implemented as a hash table. The list of data values can be implemented as a tree. Evaluating one or more entries of the table can include evaluating all of the entries of the table.

In another aspect, the invention provides a method of inspecting a log of security records in a computer network and includes retrieving a log record, hashing one or more of the fields of the log record to generate a hash key, and evaluating a hash table using the hash key. If there is no matching hash table entry, the method includes adding a new entry to the hash table. If there is a matching hash table entry, the method includes retrieving a data list associated with the hash table entry and using one or more fields of the log record to compute a data value to be inserted into the data list, evaluating the data list to determine the uniqueness of the data value and inserting the data value in the data list if the data value is unique.

In another aspect, the invention provides a method of detecting a port scan and includes retrieving a log record including a source address and a destination address, hashing the source address and the destination address to generate a hash key and evaluating a hash table using the hash key. If there is a matching hash table entry, the method includes retrieving a data list to determine if there are any matching entries, inserting the destination port with the entries in the data list if there are no matching entries and determining a port scan if the number of items in the data list exceeds a predetermined number.

In another aspect, the invention includes the computer program products for causing a computer to execute instructions to cause data processing apparatus to retrieve a log record, process a log record including deriving a key to a table, determine a data value from information in the log record and add the data value to a list of data values associated with the key if the data value is unique. One or more entries of the table are evaluated based on predetermined criteria to detect attempted security breaches.

Aspects of the invention may include one or more of the following advantages. The table may be a hash table. The list of data values may be implemented as a linked list. The list of data values may be implemented as a hash table. The list of data values may be implemented as a tree. Instructions to evaluate one or more entries of the table may include instructions to evaluate all the entries of the table.

In another aspect, the invention includes the computer program products for causing a computer to execute instructions to cause data processing apparatus to retrieve a log record, hash one or more fields of the log record to generate a hash key, and evaluate a hash table using the hash key. If there is no matching hash table entry, the invention may allow the addition of a new entry to the hash table. If there is a matching hash table entry, the invention may allow retrieval of a data list associated with the hash table entry, use of one or more fields of the log record to compute a data value, comparison of the data value with entries in the data list to determine if there are any matching entries, inserting the data value into the data list if there are no matching entries, and evaluating the data list based on predetermined criteria to detect attempted security breaches.

Aspects of the invention may include one or more of the following advantages. The invention may include instructions for adding a new entry to the hash table causing the data processing apparatus to generate an empty data list associated with the new entry to the hash table, instructions for inserting a new entry in the data list cause the data processing apparatus to trigger the evaluation of the data list, instructions for issuing a check table operation causing the data processing apparatus to trigger the evaluation of the data list, instructions for evaluating the data list based on predetermined criteria causing the data processing apparatus to block a packet associated with the log record, instructions for evaluating the data list based on predetermined criteria causing the data processing apparatus to block all future packets from a same source as a packet associated with a given log record and instructions for evaluating the data list based on predetermined criteria causing the data processing apparatus to report an attempted security breach.

The data list may be a linked list. The data list may be a hash table. The data list may be a tree. The invention may include instructions for evaluating the data list causing the data processing apparatus to evaluate the data list after a plurality of log records have been added to the data list. The invention may include instructions for evaluating the data list causing the data processing apparatus to evaluate the data list after each log record is added to the data list. The invention may include instructions for evaluating the hash table using the hash key causing the data processing apparatus to process a second hash table. The invention may include instructions for processing a second hash table causing the data processing apparatus to use the matching hash table entry to retrieve a second hash table, and using the hash key to evaluate the second hash table. If there is no matching second hash table entry, the invention may allow the addition of a new entry to the second hash table. If there is a matching second hash table entry, the invention may allow retrieval of a second data list associated with the second hash table entry, comparing the data value with entries in the second data list to determine if there are any matching entries, inserting the data value in the second data list if there are no matching entries and evaluating the second data list based on predetermined criteria to detect attempted security breaches.

In another aspect, the invention, embodied in an information carrier for inspecting a log of security records in a computer network includes a computer program product for causing the computer to execute instructions to cause the data processing apparatus to retrieve a log record, hash one or more fields of the log record to generate a hash key and evaluate a hash table using the hash key. If there is no matching hash table entry, the invention allows adding a new entry to the hash table. If there is a matching hash table entry, the invention allows retrieving a data list associated with the hash table entry, using one or more fields of the log record to compute a data value to be inserted into the data list, evaluating the data list to determine the uniqueness of the data value and inserting the data value in the data list if the data value is unique.

In another aspect, the invention, embodied in an information carrier for detecting a port scan, includes a computer program product for causing a computer to execute instructions to cause the data processing apparatus to retrieve a log record including a source address and a destination address, hash the source address and the destination address to generate a hash key, and evaluate a hash table using the hash key. If there is a matching hash table entry, the invention allows retrieving a data list associated with the hash table entry, comparing the destination port with the entries in the data list to determine if there are any matching entries, inserting the destination port into the data list if there are no matching entries and determining a port scan if the number of items in the data list exceeds a predetermined number.

Advantages of the invention may include one or more of the following features. Each log record needs to be processed only once when it is first received. The analysis of log records can be fast because a hash table is used to store and retrieve the log records. Storing the processed log records instead of the log record itself can require less memory capacity.

BRIEF DESCRIPTION OF THE DRAWINGS

Like reference numbers and designations in the various drawings indicate like elements.

DETAILED DESCRIPTION

Figure 1A:
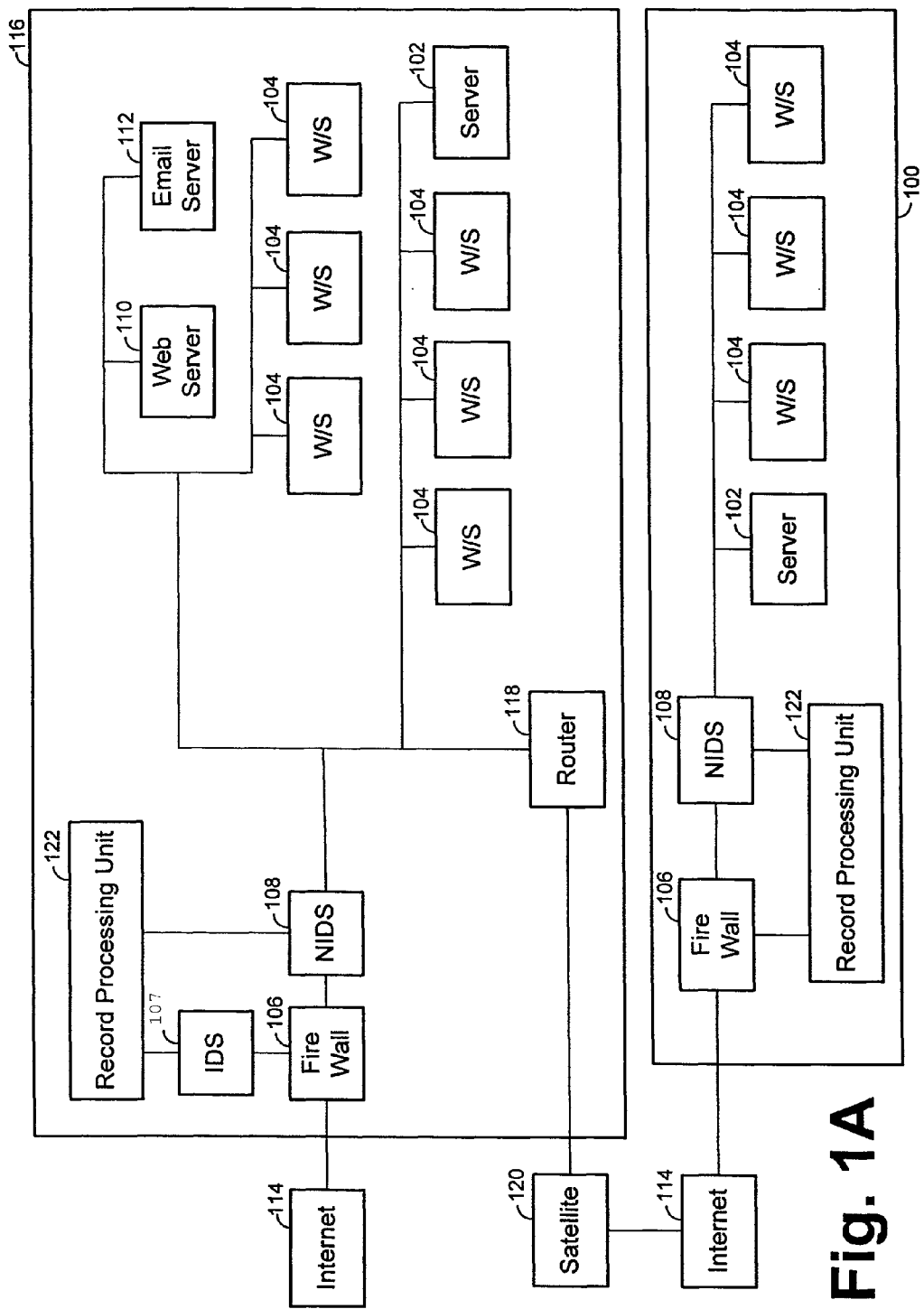
FIG. 1A shows a network topology including a NIDS operating in inline mode.
Figure 1B:
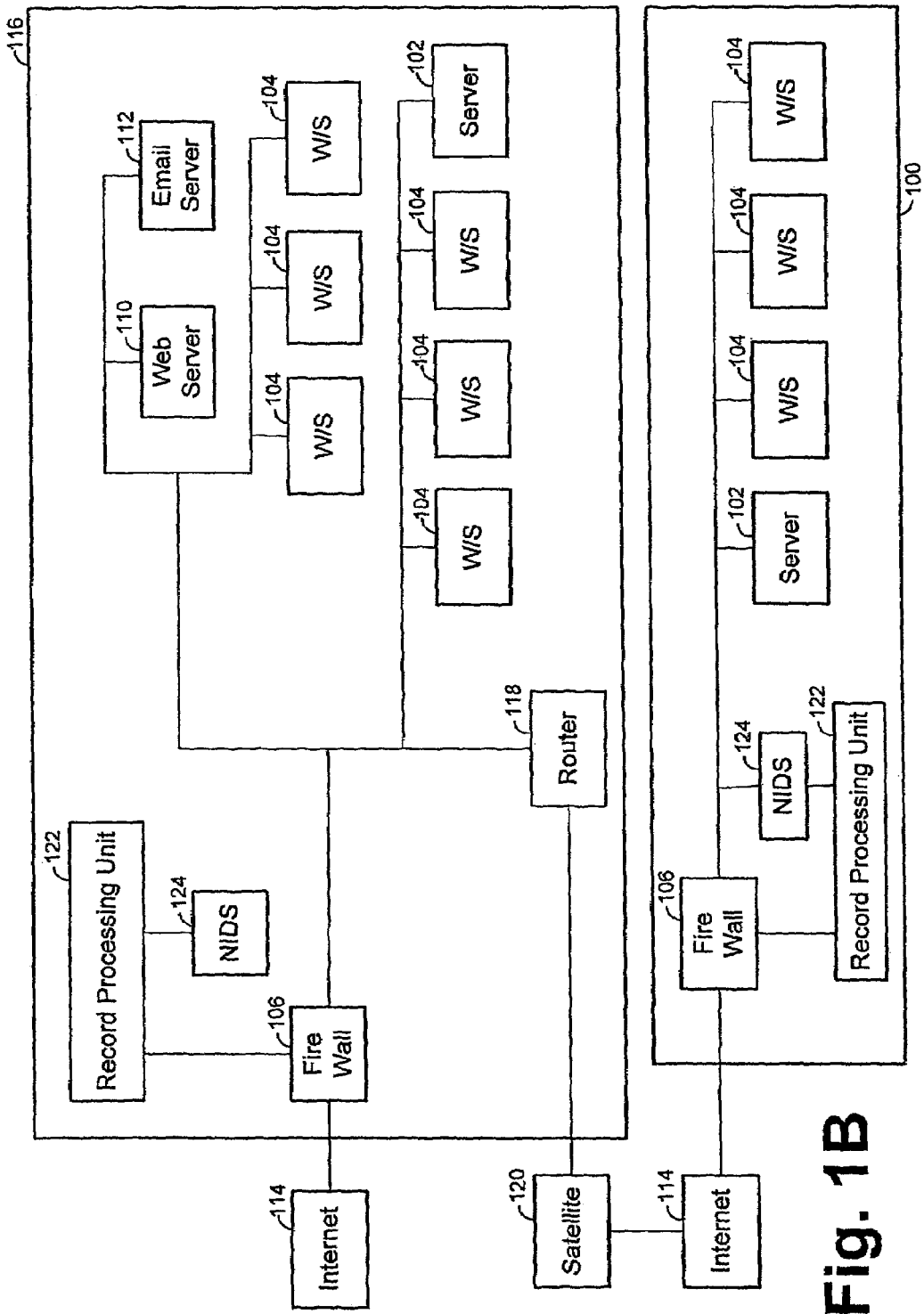
FIG. 1B shows a network topology including a NIDS operating in non-inline mode.

FIG. 1A shows a network topology including a local area network (LAN) 100, including a server 102, several workstations (W/S) 104, a firewall 106, and NIDS 108. The NIDS 108 operates in inline mode and analyzes information as it is being communicated in the network. The LAN 100 is connected to an external network, e.g., the Internet 114, through the firewall 106. The LAN 100 is also connected to a second LAN 116 through a router 118, and satellite 120. Second LAN 116 includes a web server 110, an email server 112, a server 102, several workstations 104, a firewall 106 and NIDS 108. The computers, servers and other devices in the LAN are interconnected using a number of data transmission media such as wire, fiber optics, and radio waves. Each LAN uses intrusion detection systems (IDS), such as IDS 107, to analyze messages being communicated within the network and recognize suspicious patterns of behavior. Each LAN 100 and 116 includes a record processing unit 122 connected to firewall 106 and NIDS 108. The record processing unit (RPU) 122 receives log records from one of firewall 106 and NIDS 108 and analyzes the log records to detect attempted network security intrusions. Alternatively, the NIDS can be configured outside the transmission path, in a passive (non-inline) mode. In the non-inline mode, the NIDS device monitors and inspects traffic received by the network, but only reports (i.e., does not drop packets) that are determined to match specified attack signatures. FIG. 1B shows a network topology including NIDS 124 operating in non-inline mode. The NIDS 124 receives information being communicated in the network, determines attacks and can report or otherwise passively act to block future communications from unauthorized or disruptive users.

Figure 2:
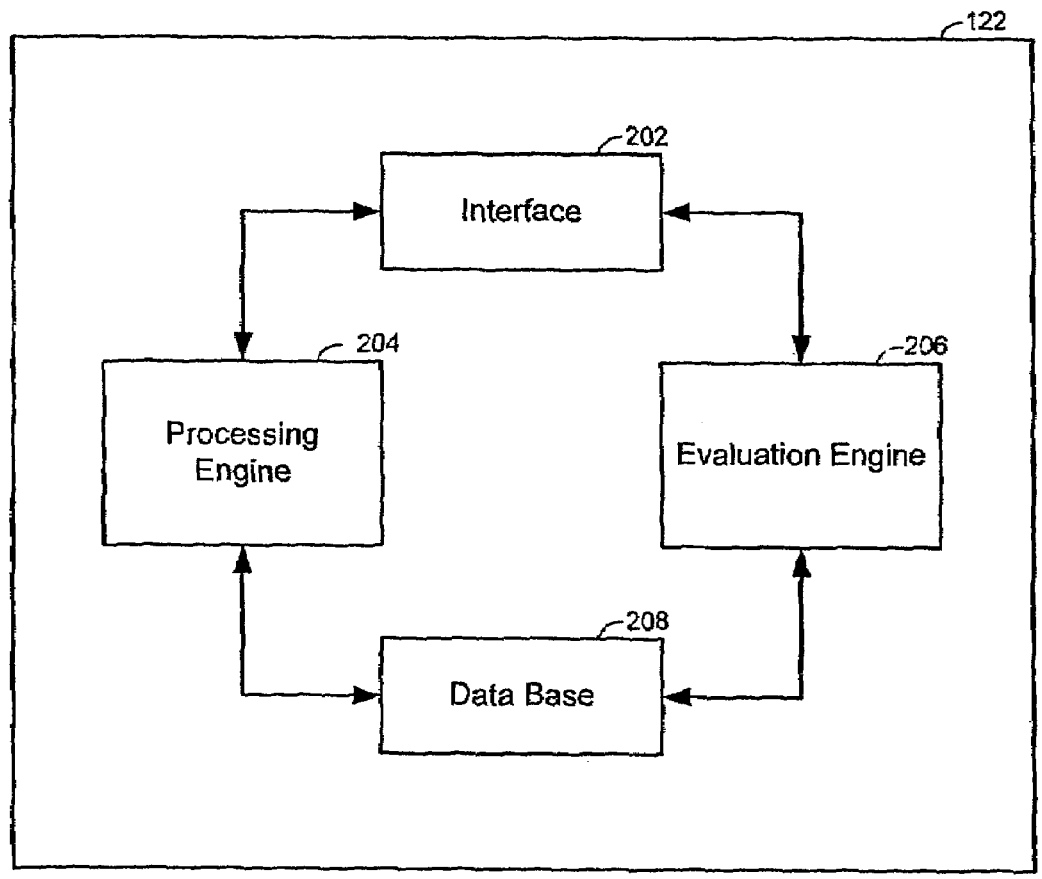
FIG. 2 is a flowchart describing the operation of a record processing unit.

FIG. 2 is a block diagram of the RPU 122. The RPU 122 includes an interface 202 for communicating (e.g. to firewalls, and intrusion detection systems) with one or more security devices on the network. Interface 202 is used to receive security logs. The RPU 122 uses a processing engine 204 to process security logs received from the security devices on the network. The processed log records are stored in a database 208. An evaluation engine 206 uses the processed log records stored in the database 208 to detect attempted network security breaches. Any attempted network security breaches detected by RPU 122 can be communicated to a respective security device using interface 202.

RPU 122 can be operated in at least two different modes. In the first mode, a plurality of log records are received and processed. The first mode is referred to as the off-line mode. In the second mode, the RPU receives and processes individual log records as they are generated. The second mode is referred to as the on-line mode.

Figure 3:
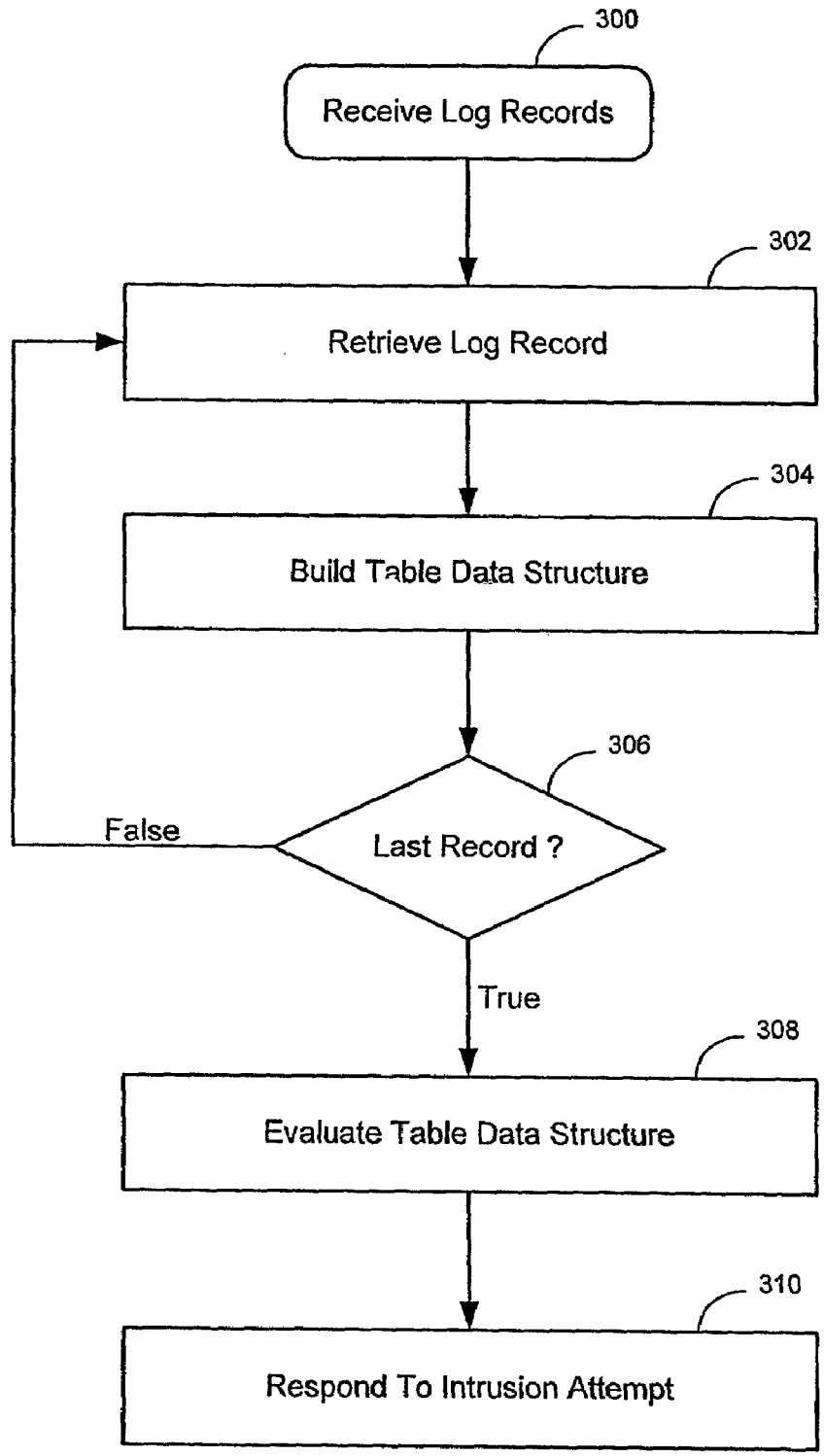
FIG. 3 is a flowchart for building a table in static mode.

FIG. 3 is a flow diagram describing the off-line mode of operation. In the off-line mode, a log of records is communicated to the RPU 122. The log can be produced by security devices on the network based on incoming or outgoing communications. The RPU 122 receives the log records (step 300) and retrieves individual records (step 302) for processing. The log record is used to build and update a table data structure (step 304). If there are additional log records that need to be processed (step 306) control passes to step 302 at which time the process repeats and the next log record is processed. In one implementation, the table data structure is evaluated (step 308) after all the log entries have been processed and RPU 122 responds if any attempted security intrusion is detected (step 310). In response to an attempted security intrusion, the RPU 122 can communicate the attempted security intrusion to the security device (e.g. firewall, IDS) or other devices on the network. In one implementation, RPU 122 can block all future packets from the source responsible for the attempted intrusion (e.g., by communicating a rule to the firewall to block all packets from the responsible source). RPU 122 can also report the attempted security intrusion to the administrator for an appropriate response.

Figure 4:
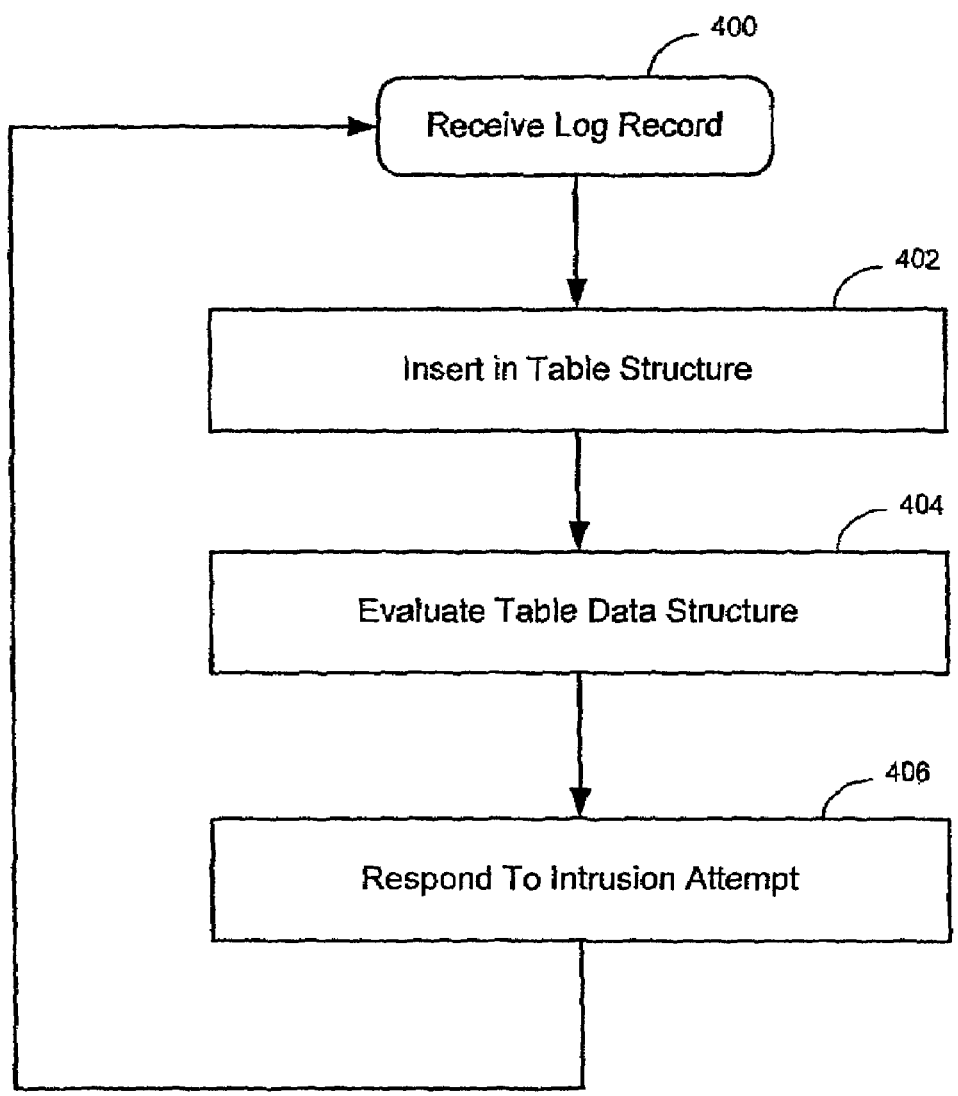
FIG. 4 is a flowchart for building a table in dynamic mode.

FIG. 4 is a flow diagram describing the on-line mode of operation. In the on-line mode, individual log records are received by RPU 122 for processing (step 400). In the on-line mode, RPU 122 processes individual log records as they are received. The processed log records are used to update the table data structure (402) and the resulting table data structure is evaluated (404) after each log record is processed. Thereafter, RPU 122 responds to any attempted intrusion (406) before RPU 122 starts processing the next log record.

Figure 5:
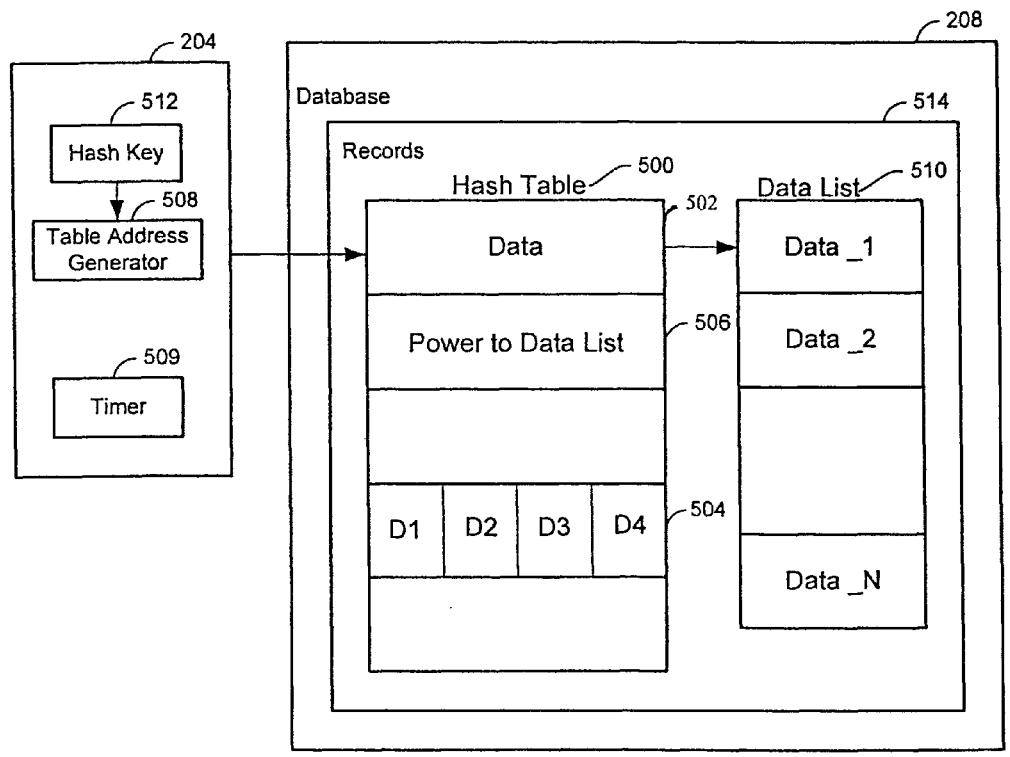
FIG. 5 describes a table data structure.

FIG. 5 describes one example of a table data structure used by RPU 122. Referring now to FIGS. 2 and 5, a hash key 512 generated by the processing engine 204 from the fields of the log record, is used to generate an address for an entry in the hash table 500 using a table address generator 508. The address generated by the table address generator 508 is used to look up the selected entry in hash table 500. Each hash table entry can either be a data value 502, a list of data values 504, a pointer to a data value 506 or a data list 520. Entries that consist of a data value or a set of data values (502 or 504) can be stored directly in the hash table 500 in database 208. For data lists, the hash table entry can be a pointer to the data list 506 in database 208. The data list 510 contains a list of data values and can be implemented using a linked list or any other suitable data structure.

The data entries in hash table 500 and the data list 510 can be tagged to expire after a predetermined duration of time. A timer 509, can be used by the processing engine to measure a specific duration time for a given data entry stored in the hash table or data list. The data entry can be deleted when the time duration has expired. One simple timer implementation includes the tagging of each entry with a time stamp. At evaluation time, the current time can be compared to the stamped time. Entries that are too old can be removed prior to the evaluation step.

Figure 6:
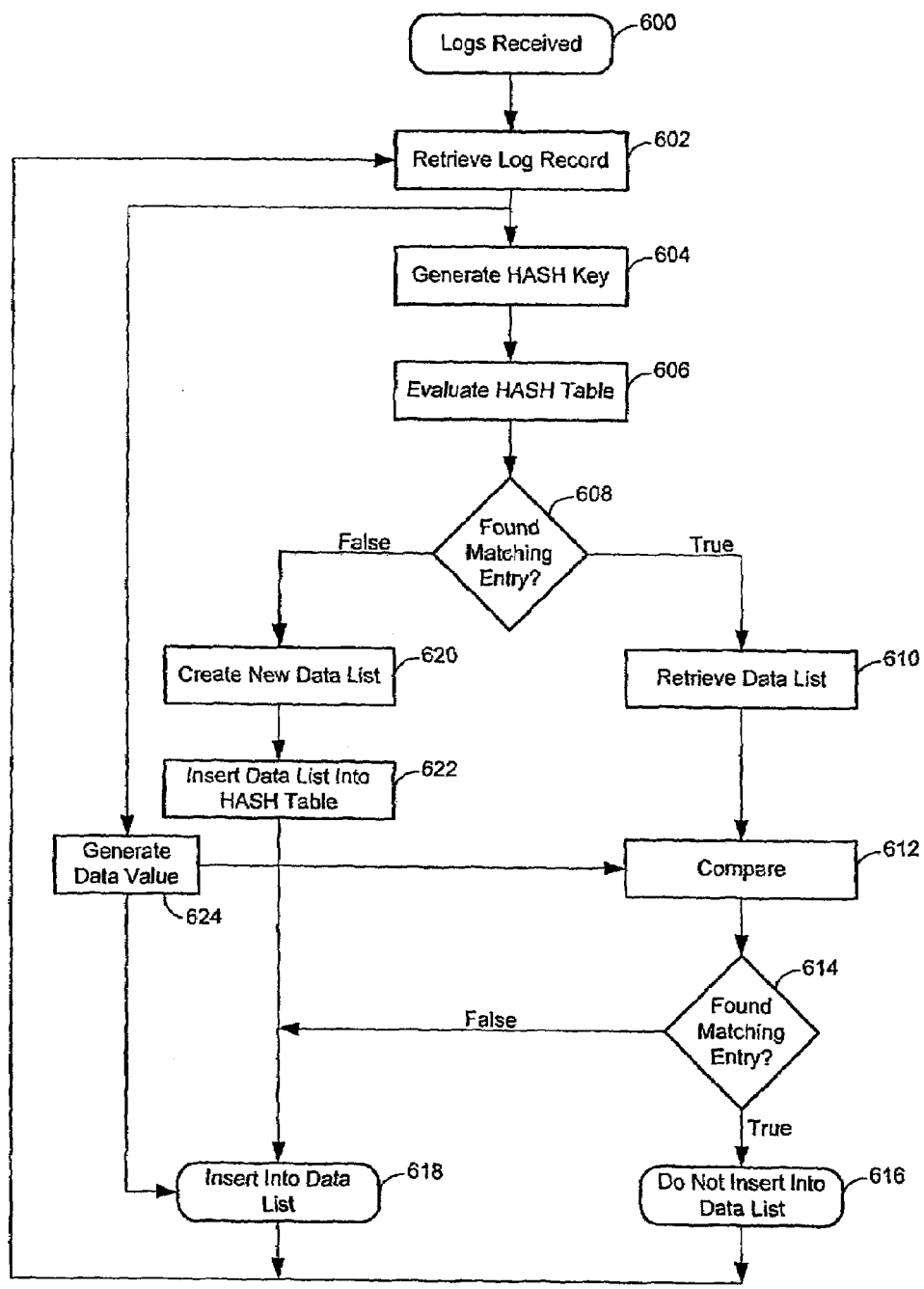
FIG. 6 is a flowchart for creating a table data structure.

FIG. 6 is a flow diagram depicting the creation of the table data structure. RPU 122 (FIG. 1 a) receives one or more logs (step 600) from one or more security devices on the network. Individual log records are retrieved (step 602) and the fields of the log record are used to generate a hash key (step 604). The generated hash key is used to evaluate a hash table (step 606). If a matching entry is found in the hash table (step 608) a data list associated with the selected hash table entry (step 610) is retrieved. A data value generated using one or more fields of the log record (step 624), is compared with the data values in the data list (step 612). Only unique data values are inserted into the data list. If a matching entry is found in the data list (step 614), the data value derived from the log record is not inserted into the data list (step 616). If no matching entry is found in the data list, the data value is inserted into the data list (step 618) and control passes to step 602 at which time the process repeats and the next log record is processed. If no matching entry is found in the hash table during step 608, a new hash table entry and a new data list are created (step 620). The new data list is associated (step 622) with the hash table entry indicated by the generated hash key and the data value generated using the fields of the log record (step 624) is inserted into the data list (step 618). Following the completion of step 618 control passes to step 602 at which time the process repeats for each log record received.

Figure 7:
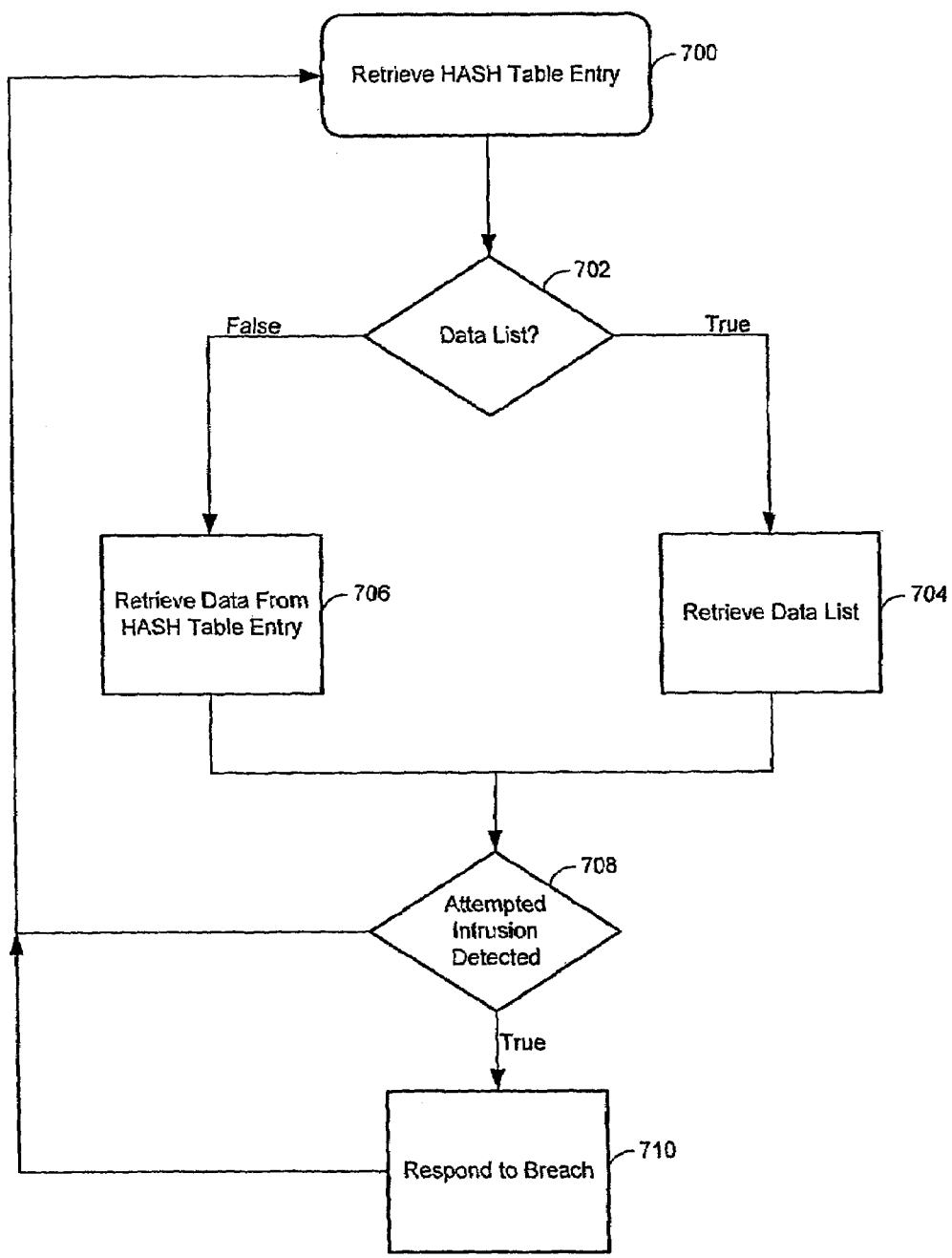
FIG. 7 is a flowchart for evaluating the table data structure.

FIG. 7 is a flow diagram describing a process of evaluating a hash table to detect attempted security breaches. The table data structure can be evaluated whenever a new entry is added to a hash table or to a data list that is part of the table data structure. In addition, a "Check Table" operation, initiated by a user, can also trigger an evaluation of the table data structure. In one implementation, the table data structure is evaluated by retrieving each hash table entry (step 700). If the entry is a pointer to a data list (step 702) the data list is retrieved (step 704). If the table entry contains a data value or a set of data values these values are retrieved (step 706). The data values retrieved in step 704 or step 706 are compared against predetermined criteria to determine if there has been an attempted security breach (step 708). If an attempted intrusion is detected, RPU 122 can take one of a plurality of actions based on the nature of the attempted breach (step 710). RPU 122 can communicate with the NIDS or firewall to drop the current packet associated with the log record. RPU 122 can also block all future packets originating from the same source in response to an attempted security breach. In addition, RPU 122 can report any attempted security breach to the administrator for appropriate response. This process is repeated for all the entries in the hash table.

In an alternative implementation of the hash table evaluation process, only table entries that have been modified after the previous table evaluation are considered during the evaluation process. This can be accomplished by including tag fields in the hash table entry to indicate any entries that are modified as a result of inserting a new data value in the table data structure. The tag field is used to locate modified data values during the table evaluation process. The tag fields can be reset after the modified data has been used to evaluate the table. In another implementation of the hash table evaluation process, the hash table is evaluated immediately after inserting a new data value in the table data structure (i.e., right after step 618 above in FIG. 6).

Figure 8:
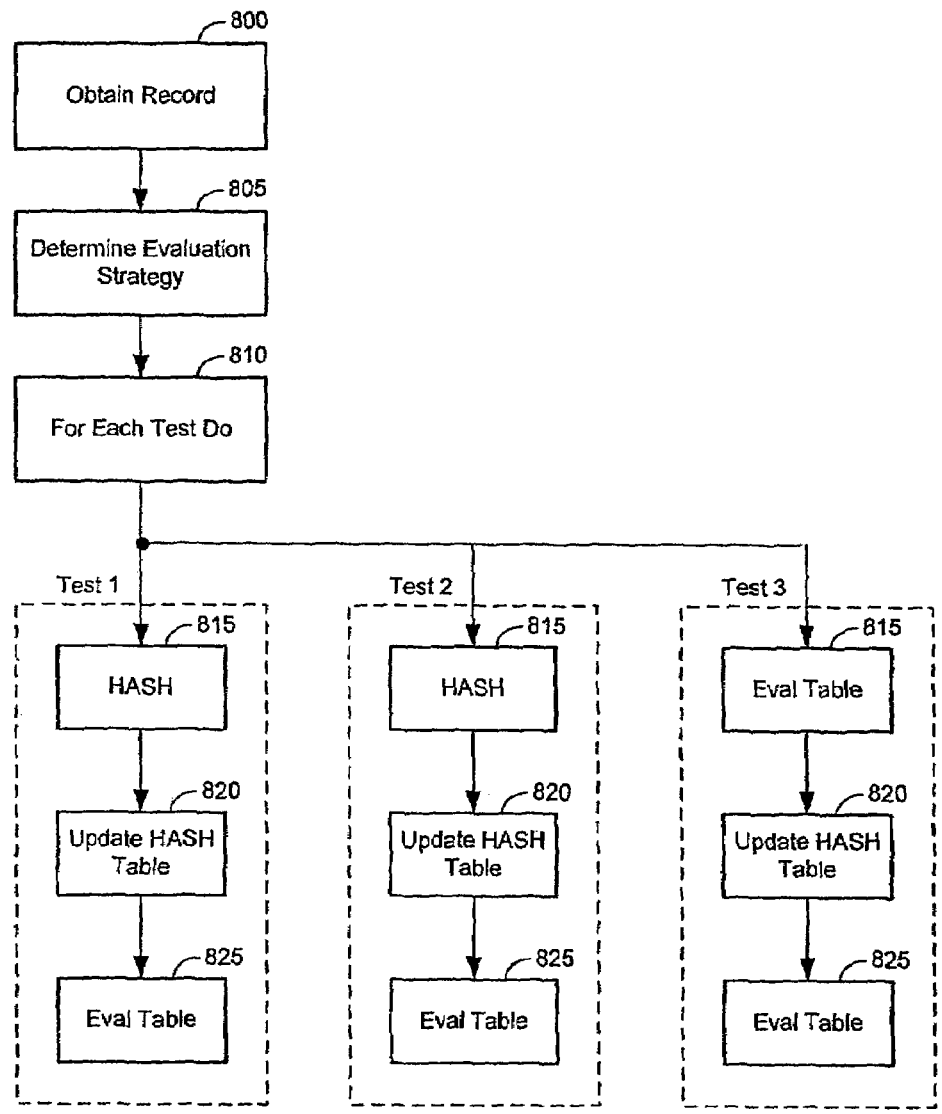
FIG. 8 illustrates the use of multiple hash tables.

RPU 122 can employ more than one hash table. FIG. 8 illustrates an example using more than one hash table to detect an attempted security intrusion. In the example, a log record is obtained by RPU 122 during either the on-line or off-line mode of operation (step 800). An evaluation strategy is determined using the log record, a hash key generated from the log record, or a combination of the log record and a hash key derived from the log record (step 805). The evaluation strategy can be used to identify the number of tests and the type of tests that should be performed for the given record. The evaluation strategy can be based on a number of criteria including, known attack signatures and prior log records originating from the same source. A number of hash keys are generated, based on the evaluation strategy, for the different type of tests that must be performed (step 815). The generated hash keys are used to update the hash tables associated with the tests to be performed (step 820). The hash tables associated with the tests are evaluated to determine if there has been an attempted security intrusion (step 825). In this example, all the hash keys and all the hash tables may not be distinct. It is possible to use the same hash key to update and evaluate two different hash tables. It is also possible to use two different hash keys to evaluate the same hash table as part of two different tests.

Figure 9:
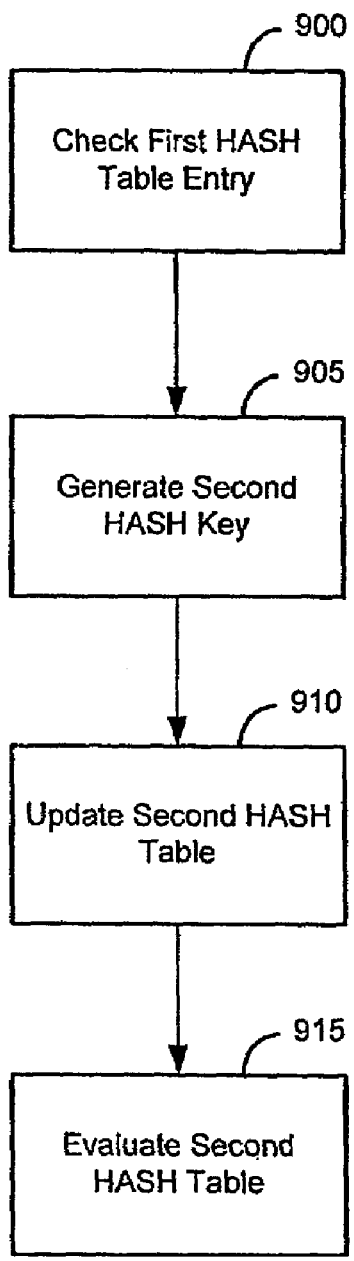
FIG. 9 illustrates the use of cascaded hash tables.

FIG. 9 illustrates an example using cascaded hash tables to detect an attempted security intrusion. In this example, as part of the table evaluation process, a first hash table entry is retrieved from a first hash table. The first hash table entry is checked by comparing the first hash table entry against a predetermined criteria (step 900). The evaluation process for detecting a particular security intrusion may require the evaluation of a second hash table. A second hash key for the second hash table can be generated using the first hash key, the first hash table entry selected by the first hash key, or a combination of the first hash key and the first hash table entry selected by the first hash key (step 905). The second hash table is updated using the second hash key (step 910) and the second hash table is evaluated to determine if there has been an attempted security intrusion (step 915). The evaluation of the individual hash tables is as described above with respect to FIG. 6.

Figure 10:
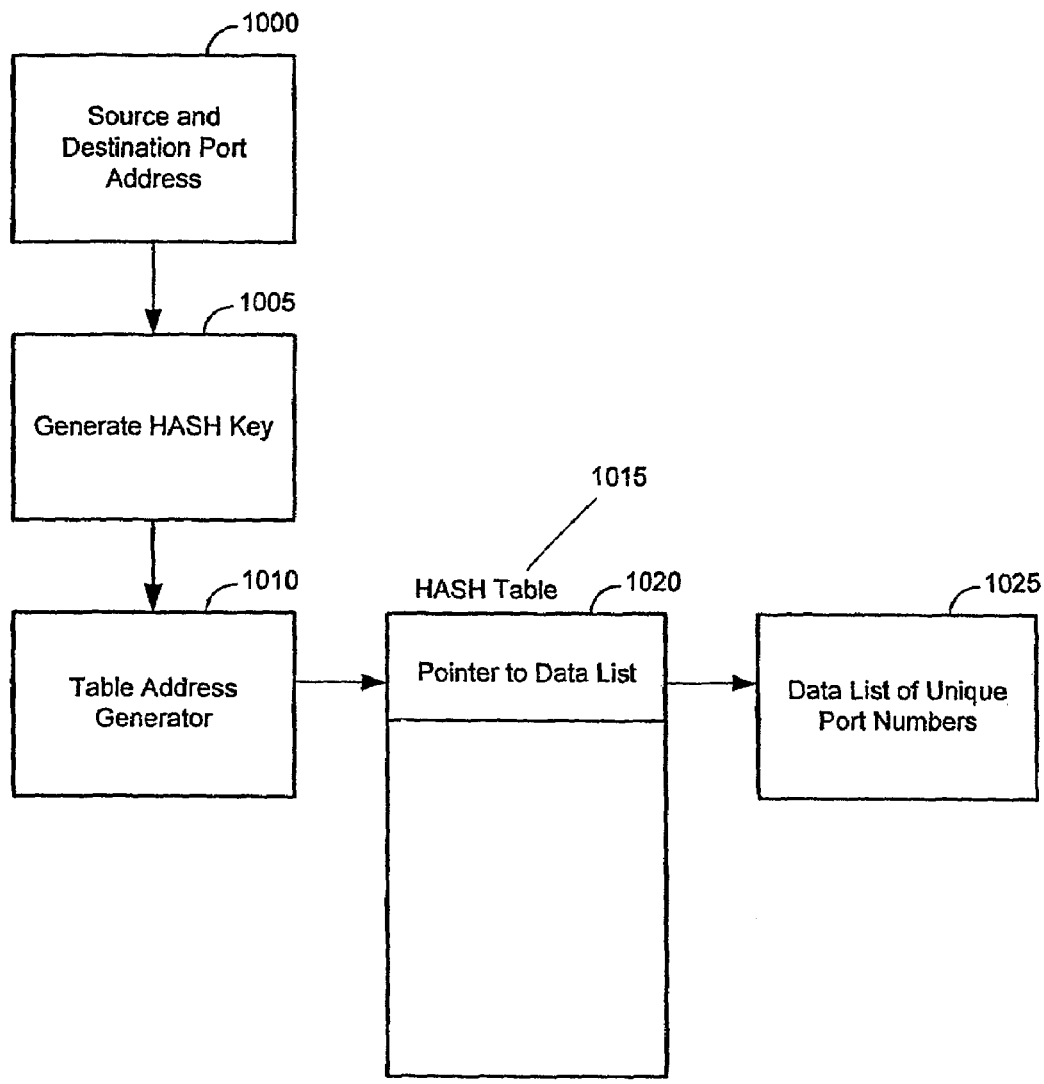
FIG. 10 shows a method for detecting a port scan attack.

FIG. 10 shows an exemplary method for detecting a port scanning attack. Port scanning, a frequently used approach for attacking computer security, gives a hacker an idea where to look for weaknesses. A port scan comprises a series of messages sent by the hacker attempting to probe a computer to learn which computer network services, each associated with a "well-known" port number, the computer provides. Essentially, the port scan consists of sending a message to each port, e.g., one at a time. The kind of response received indicates whether the port is used and accessible and can therefore be probed for weaknesses. In the present example, a log of records that include port queries is evaluated. The log can be generated by a router, firewall or other security device. RPU 122 extracts the source and destination IP addresses from the log records received (step 1000). The source and destination IP addresses as reported by the log record are used to generate a hash key (step 1005). The generated hash key is used by a table address generator 1010 to evaluate a first hash table 1015. RPU 122 adds any unique port numbers accessed by the application to the data list 1025 indicated by the hash table entry 1020 selected by the generated hash key. During a typical port scan attack, the data list 1025 accumulates a large number of entries as the hacker attempts to access a large number of ports within a short time interval. Each port number added to the data list 1025 can be tagged to expire after a predetermined duration of time, for example, using the timer 509 (FIG. 5). Once the data list 1025 accumulates a predetermined number of entries, a port scan is detected. The source and destination IP addresses included in the hash key can be used to determine the source of the scan and the computer that is being scanned.

In another example, the techniques disclosed can be used to detect a mail server attack. A typical mail server attack can proceed in three phases. During the first phase of the attack, a hacker can attempt to connect to a mail server running on a well-known port number (e.g., most SMTP mail servers run on port 25) A first entry can be stored in the database (e.g., hash table) associated with this first phase of the attack. More particularly, a hash key derived from the source address associated with the potential hacker can be used to point to a record in the hash table. At the time of the first attack, the record can be populated with a first entry indicating that a potential hacker from the identified source address has contacted the mail server. During the second phase of the attack, a NIDS or a HIDS detects a exploitation attempt, e.g., a buffer overflow. The exploitation attempt is associated with a particular source, and accordingly, a check can be made in the hash table for a record associated with the source. More specifically, the source address is used to generate a key, which then is used to scan the hash table for a matching entry. If matching record is located in the database, then a second element can be added to the located record to indicate that the source attempted a detected exploitation of the system. During the third phase of the attack, the mail server can initiate a connection to the network, as the hacker controls the mail server and successfully uses the mail server to send the hacker protected information (e.g., a password file). If an attempt to gain control of the mail server is detected, once again, the hash table can be updated. More specifically, a key is derived from the address of the hacker that has been detected as attempting to take over the mail server. The key is used to locate the appropriate record in the hash table associated with the hacker. The third phase can result in the population of a third element in the record associated with the hacker, indicative of the attempted take over of the mail server. At a time for evaluation, the sequence of attack events (port scan, exploitation, and mail server take over) can be recognized as a mail server attack and an appropriate response generated.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN) and a wide area network ("WAN), e.g., the Internet.

The computing system can include clients and servers. A client and server are generally remote from each other and typically interact through a communication network. The relationship of client and server arises by virtue of computer programs running on the respective computers and having a client-server relationship to each other.

This invention has been described in terms of particular embodiments. Nevertheless, it will be understood that various modifications may be made without departing from the spirit and scope of the invention. For instance, the steps of the invention can be performed in a different order and still achieve desirable results. Instead of using hash tables, other equivalent data structures can be used. The hash tables can be stored using an SQL database. Accordingly, other embodiments are within the scope of the following claims.

The invention claimed is:

1. A network device including an interface to receive a log of security records from a plurality of network security devices in a computer network, the network device comprising:
a processor;
the processor to process a log record, including deriving a key to a table and tagging the key with a time stamp, and
determine a data value from information in the log record and adding the data value including a tag field to a list of data values associated with the key if the data value is not already in the list of data values, wherein the time stamp and the tag field differ, and the tag field indicates that the key has been modified by the addition of the data value since a prior evaluation;
a database to store the table; and
an evaluation engine to:
retrieve entries of the table not having the tag field,
retrieve entries of the table having the tag field,
evaluate entries of the table having the tag field based on predetermined criteria to detect attempted security breaches, and
reset the tag field of the evaluated entries to indicate that the key has been evaluated since a prior modification, and
update the time stamp.

2. The network device of claim 1, wherein the table is a hash table.

3. The network device of claim 1, wherein the list of data values is implemented as a linked list.

4. The network device of claim 1, wherein the list of data values is implemented as a hash table.

5. The network device of claim 1, wherein the list of data values is implemented as a tree.

6. The network device of claim 1, wherein when evaluating entries of the table, the evaluation engine is configured to evaluate all the entries of the table.

7. A network device including an interface to receive a log of security records from a plurality of network security devices in a computer network, the network device comprising:
a processor;
the processor to generate a hash key based on one or more fields of a log record; and
a database to store a plurality of hash tables;
an evaluation engine to:
evaluate one of the stored hash tables using the hash key, and
add a new entry to the evaluated hash table if a hash table entry does not match the hash key or retrieve a data list associated with the hash table entry if the hash table entry matches the hash key;
the processor being further configured to:
compute a data value based on the one or more fields of the log record,
compare the data value with entries in the data list to identify matching entries, and
insert the data value into the data list when no matching entries are identified, wherein the data value includes a tag field and a time stamp that differ, the tag field indicating that the hash key has been modified by the insertion of the data value since a prior evaluation; and
the evaluation engine being further configured to:
retrieve entries of the hash table that do not have the tag field,
retrieve entries of the hash table that have the tag field,
evaluate the data list based on predetermined criteria to detect attempted security breaches,
reset the tag field to indicate that the hash key has been evaluated since a prior modification, and
update the time stamp.

8. The network device of claim 7, wherein adding a new entry to the hash table includes generating an empty data list associated with the new entry to the hash table.

9. The network device of claim 7, wherein inserting the data value into the data list includes triggering an evaluation of the data list.

10. The network device of claim 7, wherein the evaluation engine is further configured to receive a check table operation to trigger the evaluation of the data list.

11. The network device of claim 7, wherein when evaluating the data list based on predetermined criteria, the evaluation engine is further configured to block a packet associated with the log record.

12. The network device of claim 7, wherein when evaluating the data list based on predetermined criteria, the evaluation engine is further configured to block future packets from a same source as a packet associated with the log record.

13. The network device of claim 7, wherein when evaluating the data list based on predetermined criteria, the evaluation engine is further configured to block an attempted security attack.

14. The network device of claim 7, wherein the data list is a linked list.

15. The network device of claim 7, wherein the data list is a hash table.

16. The network device of claim 7, wherein the data list is a tree.

17. The network device of claim 7, wherein the evaluation engine is further configured to evaluate the data list after a plurality of data values have been added to the data list.

18. The network device of claim 7, wherein the evaluation engine is further configured to evaluate the data list after each data value is added to the data list.

19. The network device of claim 7, wherein when evaluating the hash table using the hash key, the evaluation engine is further configured to process a second hash table.

20. The network device of claim 19, wherein processing a second hash table includes:
   using a matching hash table entry to retrieve the second hash table;
   using the hash key to evaluate the second hash table;
   if there is no matching second hash table entry, adding a new entry to the second hash table;
   if there is a matching second hash table entry, retrieving a second data list associated with the second hash table entry;
   comparing the data value with entries in the second data list to determine if there are any matching entries; inserting the data value in the second data list if there are no matching entries; and
   evaluating the second data list based on the predetermined criteria or other predetermined criteria.

21. A system comprising:
   means for receiving a log of security records from a plurality of network security devices in a computer network,
   means for processing, including:
   means for processing a log record to derive a key to a table and tag the key with a time stamp, and
   means for determining a data value from information in the log record and adding the data value including a tag field to a list of data values associated with the key if the data value is not already in the list of data values, wherein the time stamp and the tag field differ, and the tag field indicates that the key has been modified by the addition of the data value since a prior evaluation;
   means for storing the table; and
   means for evaluating, including:
   means for retrieving entries of the table not having the tag field,
   means for retrieving entries of the table having the tag field,
   means for evaluating entries of the table having the tag field based on predetermined criteria to detect attempted security breaches, and
   means for resetting the tag field of the evaluated entries to indicate that the key has been evaluated since a prior modification, and update the time stamp.

\* \* \* \* \*